US012565550B2

(12) United States Patent
Ruenzi et al.

(10) Patent No.: US 12,565,550 B2
(45) Date of Patent: Mar. 3, 2026

(54) POLYDIENE RUBBERS WITH FUNCTIONALIZED END GROUPS

(71) Applicant: ARLANXEO DEUTSCHLAND GMBH, Dormagen (DE)

(72) Inventors: Thomas Ruenzi, Düsseldorf (DE); Norbert Steinhauser, Dormagen (DE); Kilian Wuest, Dormagen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 786 days.

(21) Appl. No.: 17/796,155

(22) PCT Filed: Mar. 24, 2021

(86) PCT No.: PCT/EP2021/057529
§ 371 (c)(1),
(2) Date: Jul. 28, 2022

(87) PCT Pub. No.: WO2021/191250
PCT Pub. Date: Sep. 30, 2021

(65) Prior Publication Data

US 2023/0098990 A1 Mar. 30, 2023

(30) Foreign Application Priority Data

Mar. 26, 2020 (EP) .................................... 20165996

(51) Int. Cl.
*C08F 136/06* (2006.01)
*B60C 1/00* (2006.01)
(Continued)

(52) U.S. Cl.
CPC .............. *C08F 136/06* (2013.01); *C08F 2/06* (2013.01); *C08F 236/10* (2013.01); *C08K 3/04* (2013.01);
(Continued)

(58) Field of Classification Search
CPC .... C08F 136/04; C08F 136/06; C08F 136/08; C08F 36/04; C08F 36/045; C08F 36/06;
(Continued)

(56) References Cited

U.S. PATENT DOCUMENTS 4,894,409 A 1/1990 Shimada et al.
4,929,679 A 5/1990 Shuichi et al.
(Continued)

FOREIGN PATENT DOCUMENTS

CA 3017422 A1 5/2017
CN 104271619 A 1/2015
(Continued)

OTHER PUBLICATIONS

International Search Report for corresponding application PCT/EP2021/057529 dated May 26, 2021.

*Primary Examiner* — Kregg T Brooks
*Assistant Examiner* — David R. Foss
(74) *Attorney, Agent, or Firm* — Norris McLaughlin, PA

(57) ABSTRACT

An end-group functionalized polymer having one or more end groups according to the general formula (I)

(I)

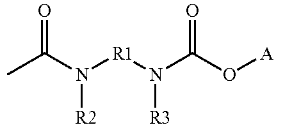

wherein
R1 represents a saturated or unsaturated, linear or branched, preferably aliphatic, hydrocarbon group having from 1 to 20
(Continued)

carbon atoms which, in addition to C and H, may contain one or more heteroatoms, preferably independently of one another selected from O, N, S or Si;
R2, R3 are identical or different and represent saturated or unsaturated hydrocarbon groups having from 1 to 20 carbon atoms and wherein the hydrocarbon group may contain, in addition to C and H atoms, one or more heteroatoms, preferably selected from the group consisting of O, N, S and Si;
A represents a residue selected from the group consisting of O-R4-OH, R5-OH and R6-NH-R7, preferably O-R4-OH wherein R4, R5 and R6 represent a saturated or unsaturated linear or branched hydrocarbon group which, in addition to C and H atoms, may contain one or more heteroatoms, independently selected from O, N, S or Si and which contains from 1 to 20 carbon atoms and wherein
R7 represents H or a linear or branched or cyclic aliphatic or aromatic hydrocarbon group having from 1 to 20 carbon atoms and which, in addition to C and H atoms, may contain one or more heteroatoms, preferably selected from O, N, S or Si;
and wherein the polymer is a homopolymer of a conjugated diene or a copolymer of at least one or more conjugated diene and one or more vinylaromatic monomer and, optionally one or more other comonomers. Also provided are a process for making the polymers and articles made with the polymers.

12 Claims, 1 Drawing Sheet

(51) Int. Cl.

| | |
|---|---|
| ***C08C 19/22*** | (2006.01) |
| ***C08F 2/06*** | (2006.01) |
| ***C08F 36/04*** | (2006.01) |
| ***C08F 36/06*** | (2006.01) |
| ***C08F 36/08*** | (2006.01) |
| ***C08F 136/04*** | (2006.01) |
| ***C08F 136/08*** | (2006.01) |
| ***C08F 236/10*** | (2006.01) |
| ***C08K 3/04*** | (2006.01) |
| ***C08K 5/156*** | (2006.01) |
| ***C08K 5/3445*** | (2006.01) |
| *C08K 5/3442* | (2006.01) |

(52) U.S. Cl.
CPC ............ *C08K 5/156* (2013.01); *C08K 5/3445* (2013.01); *B60C 1/0016* (2013.01); *C08C 19/22* (2013.01); *C08F 36/04* (2013.01); *C08F 36/045* (2013.01); *C08F 36/06* (2013.01); *C08F 36/08* (2013.01); *C08F 136/04* (2013.01); *C08F 136/08* (2013.01); *C08F 2810/40* (2013.01); *C08K 5/3442* (2013.01)

(58) Field of Classification Search
CPC .... C08F 36/08; C08F 2810/40; C08K 5/3442; C08C 19/22
See application file for complete search history.

(56) References Cited

U.S. PATENT DOCUMENTS

| | | | | |
|---|---|---|---|---|
| 5,017,636 | A * | 5/1991 | Hattori | C08L 15/00 524/300 |
| 5,552,473 | A | 9/1996 | Lawson et al. | |
| 6,875,812 | B1 | 4/2005 | Akiyama et al. | |
| 9,920,149 | B2 | 3/2018 | Steinhauser et al. | |
| 2010/0056712 | A1 | 3/2010 | Oshima | |
| 2015/0118429 | A1 | 4/2015 | Steinhauser et al. | |
| 2016/0083495 | A1 | 3/2016 | Steinhauser et al. | |
| 2019/0233624 | A1 | 8/2019 | Herzog et al. | |

FOREIGN PATENT DOCUMENTS

| | | | |
|---|---|---|---|
| CN | 105143315 | A | 12/2015 |
| CN | 108884275 | A | 11/2018 |
| CN | 109153736 | A | 1/2019 |
| EP | 2307461 | A1 | 4/2011 |
| EP | 2796471 | A1 | 10/2014 |
| JP | S62149708 | A | 7/1987 |
| JP | H01254745 | A | 10/1989 |
| JP | 2004059742 | A | 2/2004 |
| JP | 2004099662 | A2 | 4/2004 |
| JP | 2010270292 | A2 | 12/2010 |
| JP | 2013119557 | A2 | 6/2013 |

* cited by examiner

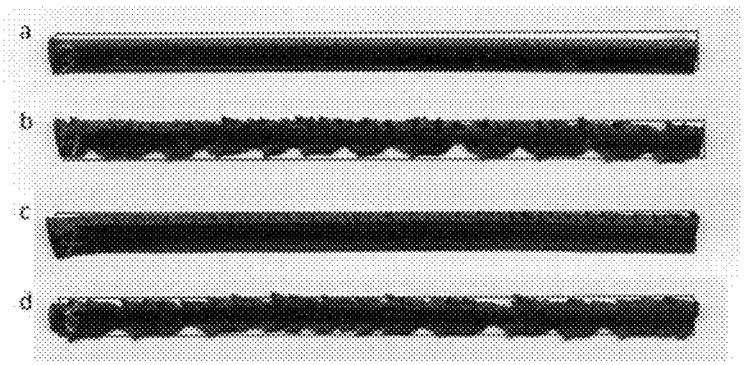
a
b
c
d

POLYDIENE RUBBERS WITH FUNCTIONALIZED END GROUPS

This is an application filed under 35 USC 371 based on PCT/EP2021/057529, filed 24 Mar. 2021, which claimed priority to EP20165996.8 filed 26 Mar. 2020. The present application claims the full priority benefit of all prior applications and incorporates by reference their full disclosures as if set forth herein.

FIELD

The present disclosure relates to polydiene rubbers with functionalized end groups, their production and use.

BACKGROUND

Polydiene rubbers are used in many different applications. They are typically combined with one or more filler to produce rubber compounds which are then shaped into articles or combined with other ingredients to produce articles. A major application of polydiene rubbers are tires or components of tires such as tire treads.

By introducing functional end groups to the polymer chain the polymers may interact better with the fillers that are used in making the rubber compounds. The most commonly used fillers are silica and carbon-based fillers, like carbon black. By physically or chemically interacting with the surface of the filler, the mobility of the polymer chains in the compound matrix is reduced and this reduces energy dissipation under dynamic stress. At the same time, these functional groups can improve the dispersion of the filler in the rubber composition, which can lead to a weakening of the filler network and thus to an improvement of compound properties.

Various end group modified rubbers have been developed. For example, U.S. Pat. No. 4,894,409 discloses a rubber composition containing silica as a filler and a modified rubber containing amino end-groups. It has been found that when using a cyclic amine as agent for modifying rubbers, tires with improved properties, like reduced rolling resistance can be prepared. However, polymers modified with a cyclic amine were found to have inferior processing properties, for example reduced Mooney scorch times, compared to the unmodified polymer. This reduces the period at which the rubber can be exposed to elevated temperatures. Modifying polymers with a cyclic amine has also been found to be detrimental to the extrusion properties of the polymer, leading to the generation of (more) surface defects. The above problems were particularly pronounced for rubber compositions containing carbon-based fillers.

SUMMARY

It has now been found that the above described problems can be reduced or overcome by using a second functionalizing agent in addition when using a the cyclic amine as a first functionalization agent. It was surprisingly found that functionalized polymers produced in this way either have improved Mooney scorch times or improved extrusion properties or both. Such polymers can be used to make compounds for the production of articles having improved properties compared to compounds made with non-functionalized polymers.

Therefore, in one aspect there is provided an end-group functionalized polymer having one or more end groups according to the general formula (I)

(I)

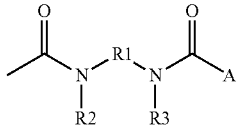

wherein R1 represents a saturated or unsaturated, linear or branched, preferably aliphatic, hydrocarbon group having from 1 to 20 carbon atoms which, in addition to C and H, may contain one or more heteroatoms, preferably independently of one another selected from O, N, S or Si;

R2, R3 are identical or different and represent saturated or unsaturated hydrocarbon groups having from 1 to 20 carbon atoms and wherein the hydrocarbon group may contain, in addition to C and H atoms, one or more heteroatoms, preferably selected from the group consisting of O, N, S and Si;

A represents a residue selected from the group consisting of O-R4-OH, R5-OH and R6-NH—R7, preferably O-R4-OH;

R4, R5 and R6 represent independently from each other a saturated or unsaturated linear or branched hydrocarbon group which, in addition to C and H atoms, may contain one or more heteroatoms, independently selected from O, N, S or Si and which contains from 1 to 20 carbon atoms;

R7 represents H or a linear or branched or cyclic aliphatic or aromatic hydrocarbon group having from 1 to 20 carbon atoms and which, in addition to C and H atoms, may contain one or more heteroatoms, and wherein the polymer is a homopolymer of a conjugated diene or a copolymer of a conjugated diene.

The polymer is obtainable by the method described below.

In another aspect there is provided a method for the preparation of an end-group functionalized polymer, comprising:

(a) polymerizing of a conjugated diene to produce a polydiene homopolymer or a polydiene copolymer;

(b) adding a first functionalization agent of the general formula (II)

(II)

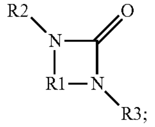

to create a first functionalized polymer containing one or more end groups obtained by the reaction of the polymer chain end of the polydiene polymer with the functionalization agent of formula (II);

(c) adding a second functionalization agent to react with the first functionalized polymer and wherein to second functionalization agent is selected from the group of cyclic carbonyls according to formula (IIIa), (IIIb) and (IIIc):

(IIIa)

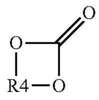

-continued (IIIb)

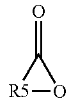

(IIIc)

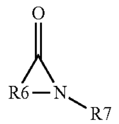

wherein R1, R2, R3, R4, R5, R6 and R7 are $R_4$, $R_6$, $R_6$ and $R_7$ are as defined as above.

In a further aspect there is provided a compound comprising the polymer.

In yet a further aspect there is provided a method of making the compound comprising mixing the polymer and at least one filler.

There is also provide an article comprising a composition obtained by vulcanizing the compound.

DESCRIPTION OF THE FIGURES

FIG. 1 shows the extruded profiles obtained in the extrusion experiments described in the experimental section.

DETAILED DESCRIPTION

Preparation of the Polymers

The end group functionalized polydiene rubbers according to the present disclosure are obtainable by a process comprising the polymerization a conjugated diene. The polymerization may be a homopolymerization or a copolymerization. The process further comprises the addition of at least one first functionalization agent to create a first functionalized polydiene polymer and the addition of at least one second functionalization agent to the first functionalized polydiene polymer.

Preferred conjugated dienes include 1,3-butadiene, isoprene, 1,3-pentadiene, 2,3-dimethylbutadiene, 1-phenyl-1,3-butadiene, 1,3-hexadiene, myrcene, ocimenes and/or farnesenes. 1,3-Butadiene and/or isoprene are particularly preferred.

In a preferred embodiment the functionalized polymer according to the present disclosure is a polybutadiene homopolymer, more preferably a 1,3-butadiene homopolymer.

In another preferred embodiment the functionalized polymer according to the present disclosure is a copolymer of a conjugated diene.

In another preferred embodiment the second functionalized polymer according to the present disclosure is a copolymer comprising units derived from one or more conjugated diene as described above and one or more vinyl aromatic monomer, and, optionally, one or more units derived from one or more other comonomers. Examples of vinylaromatic monomers include, but are not limited to, styrene, ortho-methyl styrene, meta-methyl styrene, para-methyl styrene, para-tertbutyl styrene, vinyl naphthalene, divinyl benzene, trivinyl benzene, divinyl naphthalene and combinations thereof. Styrene is particularly preferred. In a preferred embodiment the functionalized polymer according to the present disclosure comprises repeating units derived from 1,3-butadiene and styrene. Such a polymer is obtainable by a polymerization comprising the copolymerization of 1,3-butadiene with styrene.

The polydiene homo- or copolymers can be prepared by methods known in the art. Preferably the polymers can be obtained by a process comprising an anionic solution polymerization or a polymerization using one or more coordination catalysts. The polymerization may be carried out in solution or in the gas phase. Coordination catalysts in this context are Ziegler-Natta catalysts or monometallic catalyst systems. Preferred coordination catalysts are those based on Ni, Co, Ti, Zr, Nd, V, Cr, Mo, W or Fe.

Preferably the polymerization reaction comprises an anionic solution polymerization. Initiators for anionic solution polymerization include organometals, preferably based on alkali or alkaline earth metals. Examples include but are not limited to methyllithium, ethyllithium, isopropyllithium, n-butyllithium, sec-butyllithium, pentyllithium, n-hexyllithium, cyclohexyllithium, octyllithium, decyl-lithium, 2-(6-lithio-n-hexoxy)tetrahydropyran, 3-(tert-butyldimethylsiloxy)-1-propyllithium, phenyllithium, 4-butylphenyllithium, 1-naphthyllithium, p-toluyllithium and allyllithium compounds, derived from tertiary N-allylamines such as [1-(dimethylamino)-2-propenyl]lithium, [1-[bis(phenylmethyl)amino]-2-propenyl]lithium, [1-(diphenylamino)-2-propenyl]lithium, [1-(1-pyrrolidinyl)-2-propenyl]lithium, lithium amides of secondary amines such as lithium pyrrolidide, lithium piperidide, lithium hexamethylene imide, lithium 1-methyl imidazolidide, lithium 1-methyl piperazide, lithium morpholide, lithium dicyclohexylamide, lithium dibenzyl amide, lithium diphenyl amide. The allyllithium compounds and the lithium amides can also be prepared in situ by reacting an organolithium compound with the respective tertiary N-allylamines or with the respective secondary amines. Di- and polyfunctional organolithium compounds can also be used, for example 1,4-dilithiobutane, dilithium piperazide. Preferably n-butyllithium, sec-butyllithium or a combination thereof are used.

Randomizers and control agents as known in the art can be used in the polymerization for controlling the structure of the polymer. Such agents include, for example, diethyl ether, di-n-propylether, diisopropyl ether, di-n-butylether, ethylene glycol dimethyl ether, ethylene glycol diethyl ether, ethylene glycol di-n-butyl ether, ethylene glycol di-tert-butyl ether, diethylene glycol dimethyl ether, diethylene glycol diethyl ether, diethylene glycol di-n-butyl ether, diethylene glycol di-tert-butyl ether, 2-(2-ethoxyethoxy)-2-methyl-propane, triethylene glycol dimethyl ether, tetrahydrofuran, ethyltetrahydrofurfuryl ether, hexyltetrahydrofurfuryl ether, 2,2-bis (2-tetrahydrofuryl)propane, dioxane, trimethylamine, triethylamine, N,N,N', N'-tetramethyl-ethylenediamine, N-methylmorpholine, N-ethylmorpholine, 1,2-dipiperidinoethane, 1,2-dipyrrolidinoethane, 1,2-dimorpholinoethane, potassium and sodium salts of alcohols, phenols, carboxylic acids, sulphonic acids and combinations thereof.

Preferred solvents for the solution polymerization include inert aprotic solvents, for example aliphatic hydrocarbons. Specific examples include, but are not limited to, butanes, pentanes, hexanes, heptanes, octanes, decanes and cyclopentane, methylcyclopentane, cyclohexane, methylcyclohexane, ethylcyclohexane, 1,4-dimethylcyclohexane and combinations thereof and including isomers thereof. Further examples include alkenes such as 1-butene or aromatic hydrocarbons such as benzene, toluene, ethylbenzene, xylene, diethylbenzene or propylbenzene and combinations thereof. These solvents can be used individually or as mixtures. Preferred solvents are cyclohexane, methylcyclopentane and n-hexane. The solvents may also be mixed with polar solvents if appropriate.

The polymerization can be carried out by first introducing the monomers and the solvent and then starting the polymerization by adding the initiator or catalyst. The polymerization may also be carried out in a feed process where the polymerization reactor is filled by adding monomers and solvents. The initiator or catalyst are introduced or added with the monomers and solvent. Also variations may be used, such as introducing the solvent in the reactor, adding initiator or catalyst followed by adding the monomers. The polymerization can be carried out in a continuous mode or batchwise. Further monomer and solvent may be added during or at the end of the polymerization.

The polymerization time can vary from a few minutes to several hours. The polymerization is usually carried out within a period of 10 minutes to 8 hours, preferably from 20 minutes to 4 hours. The polymerization can be carried out at normal pressure or at elevated pressure (for example, from 1 to 10 bar) or at reduced pressure.

Typical reaction temperatures include temperatures between 35° C. and 130° C.

The preparation of the end-group functionalized polymers according to the present disclosure further involves the addition of a first functionalization agent followed by the addition of a second functionalization agent. The addition of the second functionalization agent can be part of a continuous process. However, it is also possible to carry out the process batchwise, for example stopping the process after the addition of the first functionalization process and starting the process again before adding the second functionalization agent. The first functionalized polymer may be isolated and then redissolved or suspended before, during or after the addition of the second functionalization agent. Preferably, the first functionalized polymer is not isolated. Preferably the process is a continuous process.

The first functionalization agent is a cyclic amine, or more specifically a cyclic urea or urea derivative. The second functionalization agent is a cyclic carbonyl. Both functionalization agents will be described in greater detail below.

The first functionalization agent can be added as such or as solution, spray, dispersion or suspension. The first functionalization agent reacts with the reactive polymer chain ends resulting in a functionalized polymer, which is referred to herein as "first functionalized polymer". Typically, the first functionalization agent is added after completion of the monomer conversion or towards the end of the polymerization reaction before completion of the monomer conversion, for example within the last 40%, the last 20%, the last 10%, the last 5%, or the last 1% of the polymerization time for converting the monomers. The addition of the first functionalization agent conveniently takes place at the same temperature at which the polymerization was carried out. However, the reaction temperature may also be increased or lowered before, during or after the addition of the first functionalization agent.

The at least one first functionalization agent may be added in equal amounts with respect to the reactive polymer chain ends, in molar excess or in substoichiometric amounts with respect to reactive polymer chain ends. Typical amounts include from 0.3 to 2 molar equivalents with respect to the molar amounts of initiator or catalyst used in the polymerization. Preferably, the first functionalization agent is used in amount in the range from 0.6 to 1.5 molar equivalents based on the molar amount of initiator or catalyst used in the polymerization.

The second functionalization agent is added after the addition of the first functionalization agent has started. Preferably there is little or no overlap when adding the first and the second functionalization agents and more preferably the second functionalization agents is added after the reaction of the first functionalization agent with the polymer is completed. The second functionalization agent may be added as such or as solution, spray, dispersion or suspension. Preferably, the second functionalization agent is added to the first functionalized polymer. The reaction of the second functionalization agent with the first functionalized polymer provides the end-group functionalized polymer according to the present disclosure.

The reaction of the second functionalization agent preferably takes place at the same temperature used for polymerization or the temperature may be raised or lowered before, during or after the addition of the second functionalization agent. The time in which the reaction of the second functionalization takes place may range from a few minutes to several hours.

The second functionalization agent may be used in amounts in the range from 0.3 to 2 molar equivalents, particularly preferably in the range from 1 to 3 molar equivalents with respect to the molar amounts of the first functionalization agent. In other words, the preferred molar ratio of first functionalization agent to second functionalization agents is from 0.3 to 2, preferably from 1:1 up to and including 1:3.

One or more polar modifiers may be added prior to or during the addition of first or second functionalization agents to reduce chain-end aggregation and increase the reactivity of the polymeric carbanions. Examples include N,N,N',N'-tetramethylethylenediamine (TMEDA), tetrahydrofurane (THF) or ditetrahydrofurylpropane (DTHFP).

Coupling reagents typical for anionic diene polymerization can also be used for reaction with the reactive polymer chain ends. Examples of such coupling reagents are silicon tetrachloride, methyltrichlorosilane, dimethyldichlorosilane, tin tetrachloride, dibutyltin dichloride, tetraalkoxysilanes, ethylene glycol diglycidyl ether, 1,2,4-tris(chloromethyl) benzene. Such coupling reagents may be added before, together with or after the compounds of the addition of the first functionalization agent.

After addition of the first and second functionalization agents and, optionally, of coupling reagents, antioxidants as known in the art, such as sterically hindered phenols, aromatic amines, phosphites, thioethers, may be added to the reaction mixture. Preferably they are added before or during the working up of the end-group functionalized polymers of the present disclosure.

The reaction may be terminated with the addition of the second functionalization agent or the reaction may be terminated after the addition of the second functionalization agent. For example, the reaction may quenched after the addition of the second functionalization agent, for example within 1 to 60 minutes or within 1 to 10 minutes or within 10 and 30 minutes, after the addition of the second functionalization agent had been completed. Quenching agents known in the art may be used, for example using an alcohol, for example octanol.

Extender oils used for diene rubbers such as TDAE (Treated Distillate Aromatic Extract)-, MES (Mild Extraction Solvates)-, RAE (Residual Aromatic Extract)-, TRAE (Treated Residual Aromatic Extract)-, naphthenic and heavy naphthenic oils can be added to the reaction mixture prior or during work up. Fillers, such as carbon-based fillers, for example carbon blacks, silica, other rubbers and rubber additives can be added to the reaction mixture prior or during work up—or also after work up to the isolated polymer as will be described in greater detail with respect to polymer compounds.

The solvent can be removed from the reaction mixture by conventional methods including distillation, stripping with steam or by applying a vacuum or reduced pressure, if necessary at elevated temperatures. The resulting polymer crumbs can be further dried on mills or processed on mills, for example into sheets, or compressed for example into bales.

The end group functionalized polymers according to the present disclosure preferably have an average molecular weight (number average, Mn) of 10,000 to 2,000,000 g/mol, preferably of 100,000 to 1,000,000 g/mol.

Preferably, the end group functionalized polymers according to the present disclosure have a glass transition temperature (Tg) of from about −110° C. to about +20° C., preferably of from about −110° C. to about 0° C.

Preferably, the end group functionalized polymers according to the present disclosure have a Mooney viscosity [ML 1+4 (100° C.)] of from about 10 to about 200, preferably from about 30 to about 150 Mooney units.

The polymers typically have a dispersity from about 1.03 to about 3.5.

First Functionalization Agents:

The first functionalization agent according to the present disclosure is a cyclic urea or a cyclic urea derivative and typically corresponds to the general formula (II)

(II)

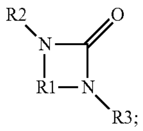

In formula (II) R1 represents a divalent, saturated or unsaturated, linear or branched, preferably aliphatic, hydrocarbon group having from 1 to 20 carbon atoms which, in addition to C and H, may contain one or more heteroatoms, preferably independently of one another selected from O, N, S or Si. Preferably R1 corresponds to the general formula (IIa):

$$—[CHX^1]_o—[CHX^2]_p—[O]_z—[CHX^3]_q— \quad \text{(IIa)}$$

wherein z is 1 or 0, o, p and q are independently selected from 0, 1 and 2 with the proviso that at least one of o, p and q is not 0. $X^1$, $X^2$ and $X^3$ are independently selected from H and linear or branched alkyl, alkylaryl and aryl groups having from 1 to 12 carbon atoms and from aminoalkyl (N—R) groups wherein R is a linear or branched or cyclic alkyl or alkylaryl residue having from 1 to 12 carbon atoms, and $X^1$ and $X^2$ may represent a chemical bond between to form a carbon-carbon bond to provide an unsaturation in the carbon chain. o, p, q, $X^1$, $X^2$ and $X^3$ are selected such that the total number of carbon atoms is not more than 20.

In one embodiment R1 is selected from substituted alkylenes, for example from substituted alkylenes corresponding to formula (IIa) wherein at least one of $X^1$, $X^2$ and $X^3$ is not H.

In one embodiment R1 is selected from unsubstituted alkylenes, for example from unsubstituted alkylenes corresponding to formula (IIa) wherein all of $X^1$, $X^2$ and $X^3$ are H. In a preferred embodiment R1 corresponds to $—[(CH)_2]_n—$, wherein n is an integer from 1 to 5, preferably 1 to 3, more preferably 1 or 2.

In one embodiment R1 is selected from unsaturated substituted or unsubstituted alkylenes and, for example, corresponds to formula (IIa) wherein $X^1$ and $X^2$ together form a carbon-carbon bond. Specific examples of unsaturated alkylenes include but are not limited to —CH═CH— or $—CH_2—CH═CH—$.

In formula (II) R2, R3 are identical or different and represent saturated or unsaturated hydrocarbon groups having from 1 to 20 carbon atoms and wherein the hydrocarbon group may contain, in addition to C and H atoms, one or more heteroatoms, preferably selected from the group consisting of O, N, S and Si. For example, R2 and R3 may be identical or different and are selected from $—(C_1\text{-}C_{20})$-alkyl, $—(C_3\text{-}C_{20})$-cycloalkyl, $—(C_6\text{-}C_{20})$-aryl, $—(C_6\text{-}C_{20})$-alkaryl or $—(C_6\text{-}C_{20})$-aralkyl radicals which may contain one or more heteroatoms, preferably independently selected from O, N, S or Si. Preferably $R_2$, $R_3$ are selected independently from each other from methyl, ethyl, n-propyl, isopropyl, n-butyl, sec-butyl, tert-butyl, trialkyl silyl with alkyl groups of 1 to 4 carbon atoms per alkyl group, phenyl and phenyls independently substituted with one, two or three methyl-, ethyl-, propyl, and/or—butyl residues.

Preferred specific examples of first functionalization agents include but are not limited to:

1,3-dimethyl-2-imidazolidinone (1), 1,3-diethyl-2-imidazolidinone (2), 1-methyl-3-phenyl-2-imidazolidinone (3), 1,3-diphenyl-2-imidazolidinone (4), 1,3-dimethyl-2-imidazolidinone (3), 1,3-dimethyl-2-imidazolidinone (3), 1,3-dimethyl-2-imidazolidinone (3), 1,3-dimethyl-2-imidazolidinone (3), 1,3-dimethyl-2-imidazolidinone (3), 1,3-dimethyl-2-imidazolidinone (4), 1,3-dimethyl-2-imidazolidinone (4), 1,3-dimethyl-2-imidazolidinone (3), 1,3,4-trimethyl-2-imidazolidinone (6), 1,3-bis(trimethylsilyl)-2-imidazolidinone (7), 1,3-dihydro-1,3-dimethyl-2H-imidazol-2-one (8), tetrahydro-1,3-dimethyl-2(1H)-pyrimidinone (9), tetrahydro-1-methyl-3-phenyl-2(1H)-pyrimidinone (10), tetrahydro-1,3,5-trimethyl-2(1H)-pyrimidinone (11), tetrahydro-3,5-dimethyl-4H-1,3,5-oxadiazin-4-one (12), tetrahydro-1,3,5-trimethyl-1,3,5-triazin-2(1H)-one (13), hexahydro-1,3-dimethyl-2H-1,3-diazepin-2-one (14):

(1)

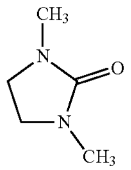

(2)

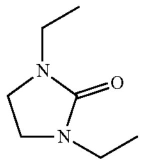

(3)

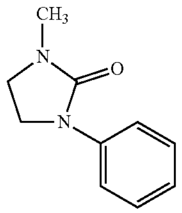

-continued (4)

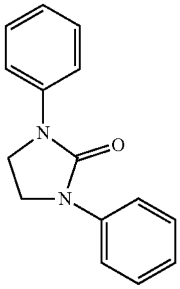

(6)

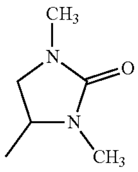

(7)

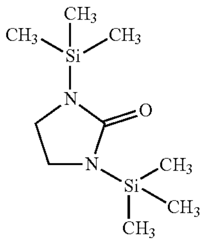

(8)

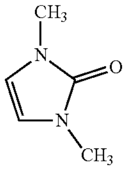

(9)

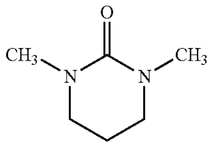

(10)

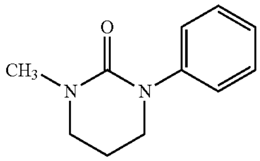

(11)

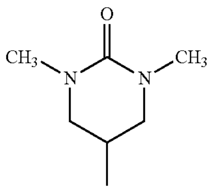

(12)

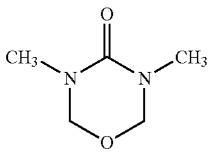

-continued (13)

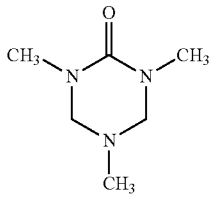

(14)

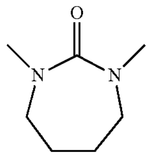

A particularly preferred example is 1,3-dimethyl-2-imidazolidinone (1), also referred to as DMI, i.e. $R_1$ is —$CH_2$—$CH_2$— and/or R2 and R3 are both —$CH_3$:

(1)

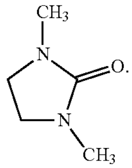

Second Functionalization Agents:

The second functionalization agents according to the present disclosure typically are cyclic carbonyls selected from the group consisting of cyclic carbonates, cyclic lactones and cyclic lactames. In one embodiment of the present disclosure cyclic carbonates are represented by formula (IIIa) and in one embodiment of the present disclosure cyclic lactones are represented by formula (IIIb) and in a further embodiment of the present disclosure cyclic lactames are represented by formula (IIIc):

(IIIa)

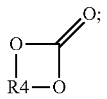

(IIIb)

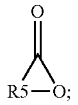

(IIIc)

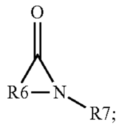

wherein

R4, R5 and R6 represent a saturated or unsaturated linear or branched hydrocarbon group containing from 1 to 20 carbon atoms and which, in addition to C and H atoms, may contain one or more heteroatoms, independently selected from O, N, S or Si.

R4, R5 and R6 may corresponds to the general formula (IIId):

$$—[CHX^1]_o—[CHX^2]_p—[O]_z—[CHX^3]_q— \quad (IIId)$$

wherein z is 1 or 0, o, p and q are independently selected from 0, 1 and 2 with the proviso that at least one of o, p and q is not 0. $X^1$, $X^2$ and $X^3$ are independently selected from H and linear or branched alkyl, alkylaryl and aryl groups having from 1 to 12 carbon atoms and from aminoalkyl (N—R) groups wherein R is a linear or branched or cyclic alkyl or alkylaryl residue having from 1 to 12 carbon atoms, and $X^1$ and $X^2$ may represent a chemical bond between to form a carbon-carbon bond to provide an unsaturation in the carbon chain. o, p, q, $X^1$, $X^2$ and $X^3$ are selected such that the total number of carbon atoms is not more than 20.

Preferably R4, R5 and R6 are unsubstituted alkylene groups, i.e. $—[CH_2]_n—$ groups with n being an integer from 1 to 5, or substituted alkylene groups wherein at least one hydrogen atom of the $—[CH_2]_n—$ unit has been replaced by an alkyl, aryl, alkaryl group. Preferred substituents are selected from the group consisting of methyl, ethyl, n-propyl, isopropyl, n-butyl, phenyl, benzyl, cyclohexyl.

R7 represents H or a linear or branched or cyclic aliphatic or aromatic hydrocarbon group having from 1 to 20 carbon atoms and which, in addition to C and H atoms, may contain one or more heteroatoms, preferably selected from O, N, S or Si. Typical examples include but are not limited to H, methyl, ethyl, propyl, butyl, phenyl, cyclohexyl, 2-phenylethyl, phenylmethyl, trialkylsilyl.

Specific examples of cyclic carbonates according to formula (IIIa) include but are not limited to ethylene carbonate (R4 is $—H_2C—H_2C—$), propylene carbonate (4-methyl-1,3-dioxolan-2-one; R4 is $—(H_3C)CH—CH_2—$), butylene carbonate, (4-ethyl-1,3-dioxolan-2-one; R4 is $—(H_5C_2)CH—CH_2$), styrene carbonate (4-phenyl-1,3-dioxolan-2-one; R4 is $—(Ph-)CH—CH_2—$).

Specific examples of lactones according to formula (IIIb) include but are not limited to alpha-acetolactone (R5=methylene, $—CH_2—$), beta-propriolactone (R5=ethylene, $—CH_2CH_2—$), gamma-butyrolactone (R5=n-propylene, $—CH_2CH_2CH_2—$), delta-valerolactone (gamma methyl gamma butyrolactone, (R5=$—(CH_3)CH_2CH_2CH_2—$=methyl-substituted propylene), delta valerolactone (R5=n-butylene=$—CH_2CH_2CH_2CH_2—$), epsilon-caprolactone (R5=pentylene $—CH_2CH_2CH_2CH_2CH_2—$).

Specific examples of lactames according to formula (IIIc) include but are not limited to N-methyl-2-pyrrolidon (R6=propylene, $—CH_2CH_2CH_2—$, R7=methyl), N-ethyl-2-pyrrolidon (R6=propylene, $—CH_2CH_2CH_2—$, R7=ethyl), N-phenyl-2-pyrrolidon (R6=propylene, $—CH_2CH_2CH_2—$, R7=phenyl), N-cyclohexyl-2-pyrrolidon (R6=propylene, $—CH_2CH_2CH_2—$, R7=cyclohexyl), N-methyl-ε-caprolactam (R6=pentylene, $—CH_2CH_2CH_2CH_2CH_2—$, R7=H), N-isobutyl-2-piperidone (R6=butylene, $—CH_2CH_2CH_2CH_2—$, R7=isobutyl).

Preferably, the second functionalization agent is selected from formula (IIIa).

Instead of a single first functionalization agent also a combination of two or more functionalization agents may be used. Instead of a single second functionalization agent also a combination of two or more second functionalization agents may be used.

The polymers according to the present disclosure are the reaction product of the reaction described above, i.e. the reaction of the second functionalization agent with the polymer functionalized by a reaction with the first functionalization agent.

The resulting polymer can be represented by having end groups of the general structure according to formula (I):

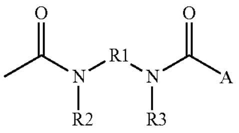
(I)

wherein A represents a residue selected from the group consisting of O-R4-OH, R5-OH and R6-NH—R7, preferably O-R4-OH, and wherein R1, R2, R3, R4, R5, R6 and R7 have the same meaning as described above.

In a preferred embodiment of the present disclosure polymers are provided that are the reaction product of the polymer functionalized with the first functionalization agent as described above with the second functionalization agent according to formula (IIa). In one embodiment such polymers are represented by the general formula (Ia):

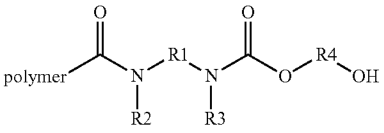
(Ia)

wherein "polymer" represents the diene homo- or copolymer as described herein and which contains at least one of the end groups shown in formula (Ia) and wherein R1, R2, R3 and R4 have the same meaning as described above.

In another embodiment of the present disclosure polymers are provided that are the reaction product of the polymer functionalized with the first functionalization agent as described above with the second functionalization agent according to formula (IIb). In one embodiment such polymers are represented by the general formula (Ib):

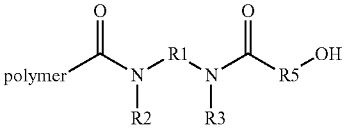
(Ib)

wherein "polymer" represents the diene homo- or copolymer as described herein and which contains at least one of the end groups shown in formula (Ib) and wherein R1, R2, R3 and R5 have the same meaning as described above.

In another embodiment of the present disclosure polymers are provided that are the reaction product of the polymer functionalized with the first functionalization agent as described above with the second functionalization agent according to formula (IIc). In one embodiment such polymers are represented by the general formula (Ic):

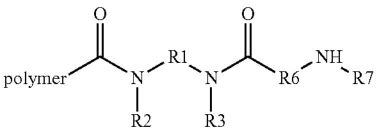
(Ic)

wherein "polymer" represents the diene homo- or copolymer as described herein and which contains at least one of the end groups shown in formula (Ic) and wherein R1, R2, R3, R6 and R7 have the same meaning as described above.

Rubber Compounds

The end group functionalized polymers according to the present disclosure can be used to make rubber compounds by a process comprising mixing the end group functionalized polymer with one or more filler. The end group functionalized polymers according to the present disclosure can also be used to make vulcanisable rubber compounds by a process comprising mixing the end group functionalized polymer with one or more filler and one or more cross-linking agent for cross-linking at least the end group functionalized polymer. The rubber compounds are suitable for making tires or components of tires such as sidewalls or tire treads. The vulcanizable rubber compounds according to the present disclosure contain one or more curing agent or curing system for cross-linking the end-group functionalized polymer according to the present disclosure and, optionally, other cross-linkable fillers or components. The resulting tire or tire component will typically contain the rubber compound in is vulcanized form.

The rubber compounds and the vulcanizable rubber compounds contain one or more filler and include both active and inactive fillers. Conventional fillers can be used. Conventional fillers include silicas, silicates and, preferably, one or more than one carbon-based fillers, for example carbon blacks.

Examples of suitable silicas include but are not limited to:

highly disperse silicas, produced for example by precipitation of solutions of silicates or flame hydrolysis of silicon halides with specific surfaces of 5-1000, preferably 20-400 $m^2/g$ (BET surface) and primary particle sizes of 10-400 nm. Silicas may also be present as mixed oxides with other metal oxides such as Al, Mg, Ca, Ba, Zn, Zr, Ti oxides;

synthetic silicates such as aluminum silicate, alkaline earth silicate such as magnesium silicate or calcium silicate, with BET surfaces of 20-400 $m^2/g$ and primary particle diameters of 10-400 nm;

natural silicates such as kaolin, montmorillonite and other naturally occurring silicas.

Examples of suitable fillers that are not silicas and are not carbon-based include but are not limited to:

glass fibers and glass fiber products (mats, strands) or microspheres (which may also contain silicas or silicates);

metal oxides such as zinc oxide, calcium oxide, magnesium oxide, aluminum oxide;

metal carbonates, such as magnesium carbonate, calcium carbonate, zinc carbonate;

metal hydroxides, such as aluminum hydroxide, magnesium hydroxide;

metal sulfates, such as calcium sulfate, barium sulfate;

rubber gels, in particular those based on BR, E-SBR and/or polychloroprene, preferably with particle sizes from 5 to 1000 nm.

Examples of suitable carbon-based fillers include but are not limited to carbon blacks produced by the flame soot, channel, furnace, gas soot, thermal, acetylene soot or arc process. The carbon-based fillers may have BET surfaces of 9-200 m2/g. Examples of specific carbon blacks include but are not limited to SAF-, ISAF-LS-, ISAF-HM-, ISAF-LM-, ISAF-HS-, CF-, SCF-, HAF-LS-, HAF-, HAF-HS-, FF-HS-, SPF-, XCF-, FEF-LS-, FEF-, FEF-HS-, GPF-HS-, GPF-, APF-, SRF-LS-, SRF-LM-, SRF-HS-, SRF-HM- and MT-soot or according to ASTM N110-, N219-, N220-, N231-, N234-, N242-, N294-, N326-, N327-, N330-, N332-, N339-, N347-, N351-, N356, N358, N375, N472, N539, N550, N568, N650, N660, N754, N762, N765, N774, N787 and N990 carbon blacks.

Preferably, the rubber compounds of the present disclosure contain one or more carbon blacks as fillers.

The fillers can be used alone or in a mixture. In a particularly preferred form, the rubber compositions contain a mixture of silica fillers, such as highly dispersed silicas, and carbon black. The weight ratio of silica fillers to carbon black may be from 0.01:1 to 50:1, preferably from 0.05:1 to 20:1.

The fillers may be used in quantities ranging from 10 to 500, preferably from 20 to 200 parts by weight based on 100 parts by weight of rubber.

The rubber compounds and the vulcanizable rubber compounds may further contain one or more additional rubbers other than the functionalized rubbers according to the present disclosure and one or more than one rubber additive.

Additional rubbers include, for example, natural rubber and synthetic rubber. If present, they may be used in amounts in the range from 0.5 to 95% by weight, preferably in the range from 10 to 80% by weight, based on the total amount of rubber in the composition.

Examples of suitable synthetic rubbers include BR (polybutadiene), acrylic acid alkyl ester copolymers, IR (polyisoprene), E-SBR (styrene-butadiene copolymers produced by emulsion polymerization), S-SBR (styrene-butadiene copolymers produced by solution polymerization), IIR (isobutylene-isoprene copolymers), NBR (butadiene-acrylonitrile copolymers), HNBR (partially or completely hydrogenated NBR rubber), EPDM (ethylene-propylene-diene terpolymers) and mixtures thereof. Natural rubber, E-SBR and S-SBR with a glass temperature above −60° C., polybutadiene rubber with a high cis content (>90%) produced with catalysts based on Ni, Co, Ti or Nd, polybutadiene rubber with a vinyl content of up to 80% and mixtures thereof are of particular interest for the manufacture of automotive tires.

Rubber additives are ingredients that may improve the processing properties of the rubber compositions, serve to crosslink the rubber compositions, improve the physical properties of the vulcanizates produced from the rubber, improve the interaction between the rubber and the filler or serve to bond the rubber to the filler. Rubber auxiliaries include crosslinking agents such as sulfur or sulfur-supplying compounds, reaction accelerators, antioxidants, heat stabilizers, light stabilizers, ozone stabilizers, processing aids, plasticizers, tackifiers, blowing agents, dyes, pigments, waxes, extenders, organic acids, silanes, retarders, metal oxides, extender oils such as DAE (Distillate Aromatic Extract)-, TDAE (Treated Distillate Aromatic Extract)-, MES (Mild Extraction Solvates)-, RAE (Residual Aromatic Extract)-, TRAE (Treated Residual Aromatic Extract)-, naphthenic and heavy naphthenic oils as well as activators.

The total amount of rubber additives may range from 1 to 300 parts by weight, preferably from 5 to 150 parts by weight based on 100 parts by weight of total rubber in the composition.

The rubber compositions can be prepared with conventional processing equipment for making and processing of (vulcanizable) rubber compounds and include rollers, kneaders, internal mixers or mixing extruders. The rubber compositions can be produced in a single-stage or a multi-stage process, with 2 to 3 mixing stages being preferred. Cross-linking agents, for example sulfur, and accelerators may be added in a separate mixing stage, for example on a roller, with temperatures in the range of 30° C. to 90° C. being preferred. Cross-linking agent, for example sulfur, and accelerator are preferably added in the final mixing stage.

Applications

The rubber compositions according to the present disclosure can be used for the production of rubber vulcanizates, in particular for the production of tires, in particular tire treads.

The (vulcanizable) rubber compositions provided herein are also suitable for the manufacture of molded articles, for example for the manufacture of cable sheaths, hoses, drive belts, conveyor belts, roll linings, shoe soles, sealing rings and damping elements.

Another aspect of the present disclosure relates to a molded article, in particular a tire, containing a vulcanized rubber composition obtained by vulcanizing the vulcanizable rubber compositions provided according to the present disclosure.

The following examples are provided to further illustrate the present disclosure without, however, intending to limit the disclosure to the embodiments set forth in these example.

EXAMPLES

Methods

Polymer Data:

The number-average molecular weight Mn, the dispersity Ð=Mw/Mn and the degree of coupling of the styrene-butadiene rubbers were determined using gel permeation chromatography (GPC) at 35° C. (polystyrene calibration).

The Mooney viscosity of the polymer was measured according to DIN ISO 289-1 (2018) at the measuring conditions ML(1+4) at 100° C.

The vinyl and styrene content can be determined by FTIR spectroscopy on rubber films.

Properties of Compounds:

The Mooney scorch times were measured at 125° C. according to DIN ISO 289-2 (2018). The MS-t3, MS-t5 and MS-t10 values correspond to the time (starting with the insertion of the sample material) when the viscosity increases by 3 MU, 5 MU and 10 MU, respectively, compared to the viscosity minimum.

The compounds were extruded on a Brabender Plastograph EC Plus extruder (LID=19/10) with a die that has the dimensions of a Garvey Die (ASTM D 2230) reduced by half. The extrusion experiments were performed at 100° C.

Properties of Vulcanized Compounds:

The loss factors tan δ (also referred herein as "tan delta") were measured at 0° C. and at 60° C. to determine the temperature-dependent dynamic-mechanical properties. An Eplexor device (Eplexor 500 N) from Gabo was used for this purpose. The measurements were carried out in accordance with DIN 53513 at 10 Hz on Ares strips in the temperature range from −100° C. to 100° C. The Eplexor 500 N was used for this purpose. To determine the strain-dependent dynamic-mechanical properties, ΔG' was determined as the difference between the shear modulus at 0.5% strain and the shear modulus at 15% strain as well as the maximum loss factor tan δmax. These measurements were done in accordance with DIN53513-1990 on an MTS elastomer test system on cylinder specimens (20×6 mm) with 2 mm compression at a temperature of 60° C. and a measuring frequency of 10 Hz in the strain range from 0.1% to 40%.

The rebound elasticity was determined at 60° C. according to DIN 53512.

EXAMPLES

1. Synthesis of Polymers

Comparative Example 1 (C1): Synthesis of Unmodified Polybutadiene 8500 g hexane, 4.18 ml n-butyl lithium (23 wt. % in hexane) and 1500 g 1,3-butadiene were filled into a 20 l reactor and polymerized at 70° C. for 1 h. Subsequently, the polymerization was quenched with octanol which stops the polymerization of the anionic polymer chain ends. 4.5 g IRGANOX 1520 was added to stabilize the polymer. The solution was precipitated into ethanol and dried at 70° C. under reduced pressure. The resulting polymer had a molecular weight ($M_n$) of 369 700 g mol$^{-1}$; Ð of 1.10, and a Mooney viscosity (ML(1+4)@100° C.) of 58 Mooney units.

Comparative Example 2 (C2): Synthesis of DMI Functionalized Polybutadiene 8500 g hexane, 3.98 ml n-butyl lithium (23 wt. % in hexane) and 1500 g butadiene were filled into a 20 l reactor and polymerized at 70° C. for 1 h. 1.84 ml ditetrahydrofurylpropane (DTHFP) were added, stirred for 5 min and 1.09 mL 1,3-dimethyl-2-imidazolidinone (DMI) were added and stirred for 20 min. Subsequently, the polymerization was quenched with octanol. 4.5 g IRGANOX 1520 was added. The solution was precipitated into ethanol and dried at 70° C. under reduced pressure. The resulting polymer had a molecular weight ($M_e$) of 340 700 g mol$^{-1}$, Ð of 1.10 and a Mooney viscosity (ML(1+4)@100° C.) of 48 Mooney units.

Example 1 (E1): Synthesis of DMI/EC Functionalized Polybutadiene 8500 g hexane, 4.48 ml n-butyl lithium (23 wt. % in hexane) and 1500 g butadiene were filled into a 20 l reactor and polymerized at 70° C. for 1 h. 2.09 ml DTHFP were added, stirred for 5 min and 1.23 mL 1,3-dimethyl-2-imidazolidinone were added and stirred for 20 min. 0.99 g ethylene carbonate dissolved in tetrahydrofurane was added and stirred for another 20 min. Subsequently, the polymerization was quenched with octanol. 4.5 g IRGANOX 1520 was added. The solution was precipitated into ethanol and dried at 70° C. under reduced pressure. The resulting polymer had a molecular weight ($M_n$) of 361 800 g mol$^{-1}$, Ð of 1.23 and a Mooney viscosity (ML(1+4)@100° C.) of 58 Mooney units.

Example 2 (E2): Synthesis of DMI/BL Functionalized Polybutadiene 8500 g hexane, 3.98 ml n-butyl lithium (23 wt. % in hexane) and 1500 g butadiene were filled into a 20 l reactor and polymerized at 70° C. for 1 h. 1.84 ml DTHFP were added, stirred for 5 min and 1.09 mL 1,3-dimethyl-2-imidazolidinone were added and stirred for 20 min. 0.77 mL gamma-butyrolactone (BL) was added and stirred for another 20 min. Subsequently, the polymerization was quenched with octanol. 4.5 g IRGANOX 1520 was added. The solution was precipitated into ethanol and dried at 70° C. under reduced pressure. The resulting polymer had a molecular weight ($M_e$) of 361 000 g $mol^{-1}$, D of 1.09 and a Mooney viscosity (ML(1+4)@100° C.) of 54 Mooney units.

2. Preparation of Compounds

The polymers obtained in examples C1, C2, E1 and E2 were mixed in an internal mixer with a volume of 1.5 liters with the ingredients and the amounts summarized in table 1 to make the compounds C3 and C4 (comparative) and E3 and E4 (according to the present disclosure). Sulfur and the accelerators were added separately to the compound composition prepared in the internal mixer on a rolling mill at 40° C.

TABLE 1 ingredients used for making the polymer compounds. All amounts are in phr (parts by weight per 100 parts by weight of total amount of rubbers).

| Compound | C3 | C4 | E3 | E4 |
|---|---|---|---|---|
| Rubber of C1 | 70 | | | |
| Rubber of C2 | | 70 | | |
| Rubber of E1 | | | 70 | |
| Rubber of E2 | | | | 70 |
| Natural rubber (TSR/RSS 3 DEFO 700) | 30 | 30 | 30 | 30 |
| Carbon black (Corax N326) | 50 | 50 | 50 | 50 |
| TDAE oil (VIVATEC 500) | 4 | 4 | 4 | 4 |
| Stearic acid (EDENOR C 18 98-100) | 3 | 3 | 3 | 3 |
| Antioxidant (VULKANOX 4020/LG) | 2 | 2 | 2 | 2 |
| Antioxidant (VULKANOX HS/LG) | 3 | 3 | 3 | 3 |
| Zink oxide (ROTSIEGEL zinc white) | 2 | 2 | 2 | 2 |
| CBS accelerator (VULKACIT CZ/EGC) | 1.4 | 1.4 | 1.4 | 1.4 |
| Sulfur (RHENGRAN IS 90-65) | 2.7 | 2.7 | 2.7 | 2.7 |

3. Vulcanisation

The compounds C3, C4, E3 and E4 were vulcanized in a heated mold at 160° C. for 11 min and tested for their properties as shown in table 3.

TABLE 2 properties of the vulcanized compounds.

| Vulcanised compound | C3 | C4 | E3 | E4 |
|---|---|---|---|---|
| Rebound at 23° C. [ %] | 57.7 | 65.8 | 63.5 | 62.4 |
| Rebound at 60° C. [%] | 60.5 | 67.5 | 65.5 | 66.5 |
| tan delta maximum (MTS, amplitude sweep at 1 Hz, 60° C.) | 0.155 | 0.122 | 0.137 | 0.129 |
| tan delta at 0° C. (Eplexor, 10 Hz) | 0.100 | 0.085 | 0.090 | 0.090 |
| tan delta at 60° C. (Eplexor, 10 Hz) | 0.075 | 0.052 | 0.060 | 0.057 |
| S300 (stress/strain experiment on S2 specimen)/MPa | 8.8 | 8.5 | 8.9 | 9.0 |

As can be seen from table 2 all modified polymers improved the performance of the vulcanisates.

Properties of the Compounds

Mooney Scorch Times:

The compounds C3, C4, E3 and E4 were tested for their Mooney scorch times at 125° C. as described in the experimental section. The results are shown in table 3.

TABLE 3

Mooney scorch times at 125° C. of the compounds.

| | C3 | C4 | E3 | E4 |
|---|---|---|---|---|
| MS-t3/s | 1254 | 1055 | 1247 | 1147 |
| MS-t5/s | 1343 | 1113 | 1312 | 1235 |
| MS-t10/s | 1446 | 1191 | 1395 | 1315 |

The results shown in table 3 indicate that the compound C4 made with polymer modified with DMI had shorter Mooney scorch times than compound C3 which was obtained from the unmodified polymer. The compound E3 made with the polymer modified with DMI and EC had Mooney scorch times superior to compound C4 and scorch times similar to those of compound C3 made with unmodified polymer. The compound E4 made with the polymer modified with DMI and BL also had superior Mooney scorch times than the compound made with the polymer modified with DMI.

Extrusion Experiments:

The compounds were extruded on a Brabender Plastograph EC Plus extruder (L/D=19/10) with a die that has the dimensions of a Garvey Die (ASTM D 2230) reduced by half. The extrusion experiments were performed at 100° C. The results are shown in FIG. 1.

As can be seen by a comparison of the profiles obtained with the compound made with unmodified polymer (C3; profile a in FIG. 1) and the profiles obtained with the compound made with the DMI-modified polymer of comparative example 2 (C4, profile b in FIG. 1), the DMI-modification deteriorates the extrusion properties. The extrusion of the compound with the DMI/EC-modified polymer (E3, profile c in FIG. 1) is superior to that of the compound with the DMI-modified polymer. The compound made with DMI/BL modified polymer (E4, profile d) had an extrusion profile similar to that of DMI-modified polymer C4.

The invention claimed is:

1. An end-group functionalized polymer having one or more end groups according to the general formula (I)

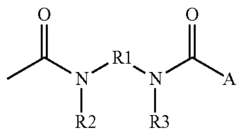

(I)

wherein

R1 represents a saturated or unsaturated, linear or branched, hydrocarbon group having from 1 to 20 carbon atoms which, in addition to C and H, may contain one or more heteroatoms;

R2, R3 are identical or different and represent saturated or unsaturated hydrocarbon groups having from 1 to 20 carbon atoms and wherein the hydrocarbon group may contain, in addition to C and H atoms, one or more heteroatoms;

A represents a residue selected from the group consisting of O-R4-OH, R5-OH; R6-NH-R7;

R4, R5 and R6 represent independently from each other a saturated or unsaturated linear or branched hydrocarbon group which, in addition to C and H atoms, may contain one or more heteroatoms, independently selected from O, N, S or Si and which contains from 1 to 20 carbon atoms;

R7 represents H or a linear or branched or cyclic aliphatic or aromatic hydrocarbon group having from 1 to 20 carbon atoms and which, in addition to C and H atoms, may contain one or more heteroatoms, and wherein the polymer is a homopolymer of a conjugated diene or a copolymer of a conjugated diene.

2. The polymer according to claim 1, wherein the conjugated diene is selected from 1,3-butadiene, isoprene, 1,3-pentadiene, 2,3-dimethylbutadiene, 1-phenyl-1, 3-butadiene and a combination thereof.

3. The polymer according claim 1, wherein the polymer is selected from homopolymers of 1,3-butadiene and copolymers 1,3-butadiene with one or more vinylaromatic monomer and one or more optional comonomers and wherein the vinylaromatic monomer is selected from the group consisting of styrene, orthomethylstyrene, meta-methylstyrene, para-methylstyrene, para-tert-butylstyrene, vinylnaphthalene, divinylbenzene, trivinylbenzene, divinylnaphthalene and combinations thereof.

4. The polymer according to claim 1, wherein the polymer is selected from homopolymers of 1,3-butadiene and copolymers of 1,3-butadiene and styrene and one or more optional comonomers.

5. The polymer according to claim 1, wherein R1 corresponds to the general formula (IIa):

$$—[CHX^1]_o—[CHX^2]—[O]_z—[CHX^3]_q— \quad \text{(IIa)}$$

wherein: z is 1 or 0, o, p and q are independently selected from 0, 1 and 2 with the proviso that at least one of o, p and q is not 0, $X^1$, $X^2$ and $X^3$ are independently selected from H, from linear or branched alkyl, alkylaryl and aryl groups having from 1 to 12 carbon atoms, and from aminoalkyl groups N-R wherein R is a linear or branched or cyclic alkyl or alkylaryl residue having from 1 to 12 carbon atoms, and from $X^1$ and $X^2$ forming together a carbon-carbon bond to provide an unsaturation in the carbon chain, and wherein o, p, q, $X^1$, $X^2$ and $X^3$ are selected such that the total number of carbon atoms is not more than 20.

6. The polymer according to claim 1, wherein R2, R3 are identical or different and are selected from methyl, ethyl, propyl, phenyl, benzyl, and trialkylsilyl wherein each alkyl group of the trialkyl silyl may contain from 1 to 4 carbon atoms and wherein the phenyl and benzyl may contain one or more substituents.

7. The polymer according to claim 1, wherein R4, R5 and R6 are selected from the group consisting of unsubstituted alkylene groups corresponding to the general formula $—[CH_2]_n—$ with n being an integer from 1 to 5, and substituted alkylene groups wherein at least one hydrogen atom of the $—[CH_2]_n—$ unit has been replaced by an alkyl, aryl, alkaryl or aralkyl group with the proviso that total number of carbon atoms is not more than 20.

8. The polymer according to claim 1, wherein R7 is selected from H, methyl, ethyl, propyl, butyl, phenyl, cyclohexyl, 2-phenylethyl, phenylmethyl, and trialkylsilyl.

9. The polymer according to claim 1, wherein R1 is $—CH_2CH_2—$ and R2 and R3 are selected from the group consisting of methyl and ethyl.

10. A compound comprising the polymer according to claim 1, and at least one filler, and wherein the compound can be vulcanized.

11. A method of making a compound according to claim 10 comprising mixing the polymer according to claim 1 and at least one filler.

12. An article comprising a composition obtained by vulcanizing the compound according to claim 10, wherein the article is selected from the group consisting of: tires, components of a tire, cable sheaths, hoses, drive belts, conveyor belts, roll linings, shoe soles, sealing rings and damping elements.

* * * * *